United States Patent [19]
Perlman

[11] Patent Number: 4,864,559
[45] Date of Patent: Sep. 5, 1989

[54] METHOD OF MULTICAST MESSAGE DISTRIBUTION

[75] Inventor: Radia Perlman, Acton, Mass.

[73] Assignee: Digital Equipment Corporation, Maynard, Mass.

[21] Appl. No.: 249,958

[22] Filed: Sep. 27, 1988

[51] Int. Cl.[4] .......................................... H04Q 11/04
[52] U.S. Cl. ........................................ 370/60; 370/93
[58] Field of Search ................ 370/85, 86, 89, 60, 370/94, 58, 93; 340/825.44; 455/13, 14

[56] References Cited

U.S. PATENT DOCUMENTS

| | | | |
|---|---|---|---|
| 4,740,954 | 4/1988 | Cotton et al. | 320/60 |
| 4,760,572 | 7/1988 | Tomikawa | 370/60 |

OTHER PUBLICATIONS

Dering, Steven E., "Multicast Routing in Internetworks and Extended LANs," 1988 ACM pp. 55-64 IEEE Network, vol. 2, No. 1 (Jan., 1988).

Wall, David W., "Mechanisms for Broadcast and Selective Broadcast," Technical Report No. 190, Stanford Electronics Laboratory, Stanford University (Jun., 1980).

Delal, Yogen K., "Broadcast Protocols in Packet Switch Computer Networks," Technical Report No. 128, Standford Electronics Laboratories, Stanford University (Apr., 1977).

Boggs, David R., "Internet Broadcasting," (Oct., 1983).

Wall, David W. et al, "Construction of Centered Shortest-Path Trees in Networks," Networks, vol. 13, pp. 207-231 (1983).

Primary Examiner—Robert L. Griffin
Assistant Examiner—Frank M. Scutch, III
Attorney, Agent, or Firm—Finnegan, Henderson, Farabow, Garrett, & Dunner

[57] ABSTRACT

A method for multicast communication wherein a multicast message is distributed to all the nodes in a multicast range. If a multicast message has a multicast range which is larger than one link in the network then the message is forwarded along a unique set of pathways through the range. The unique set of pathways is called a multicast spanning tree and is unique to all nodes which can communicate directly by virtue of a list of known nodes. The network is divided into areas each of which contains a group of directly communicating nodes. A group of nodes designated as level two nodes facilitates communication between the nodes in different areas.

11 Claims, 5 Drawing Sheets

MULTICAST SPANNING TREE
FOR LEVEL I NODES

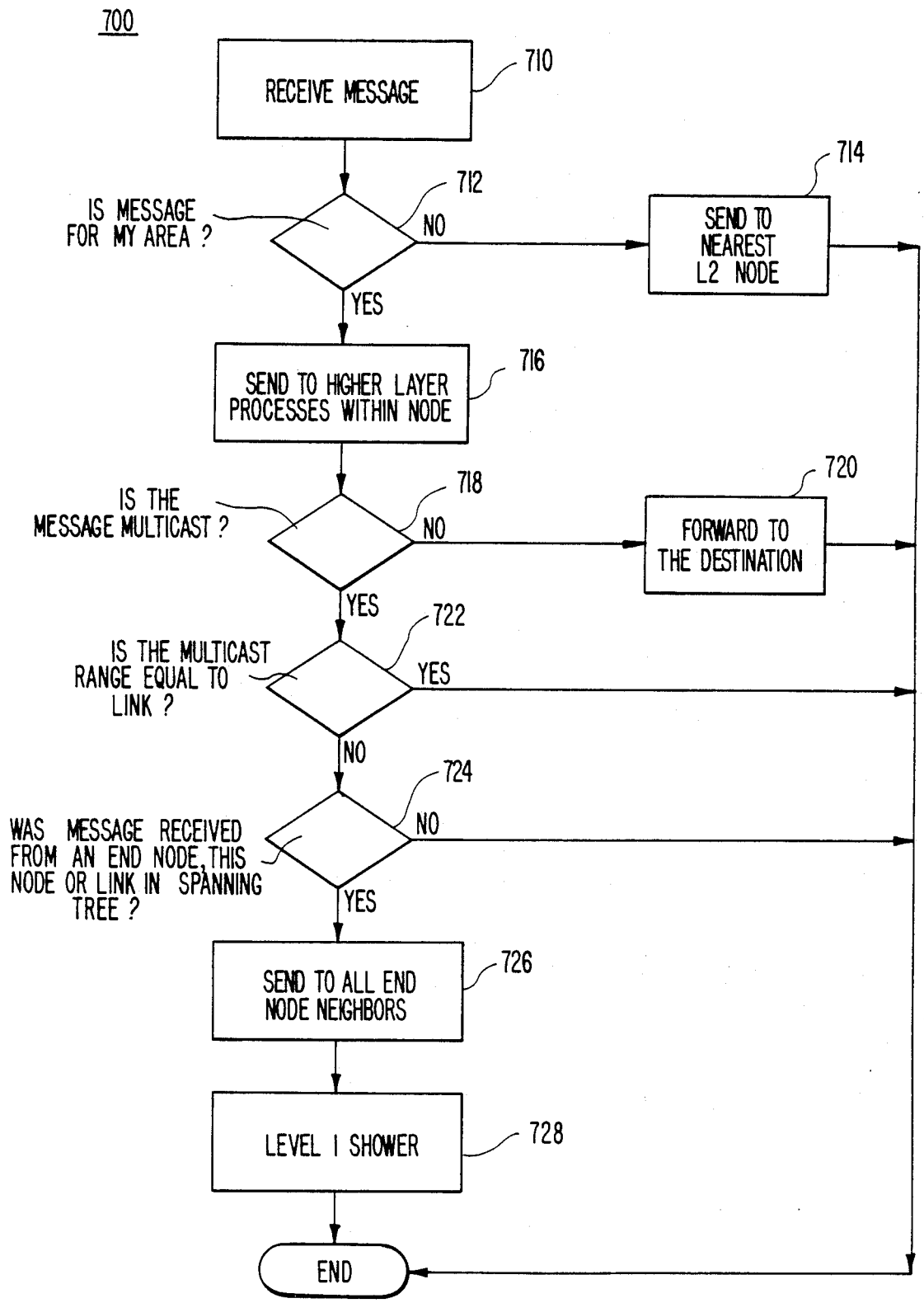

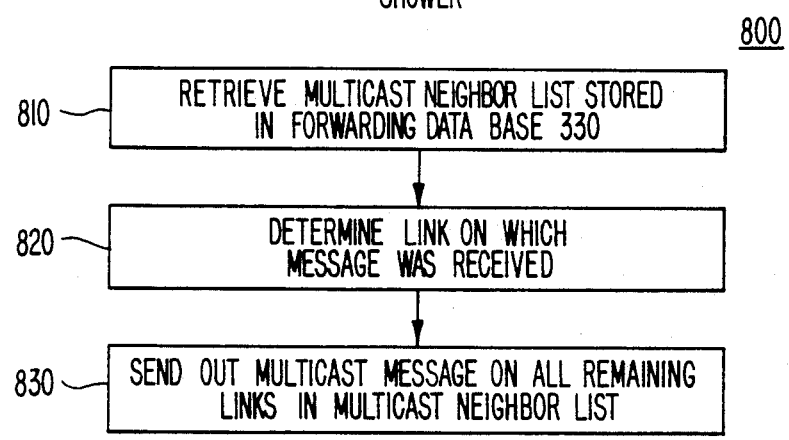
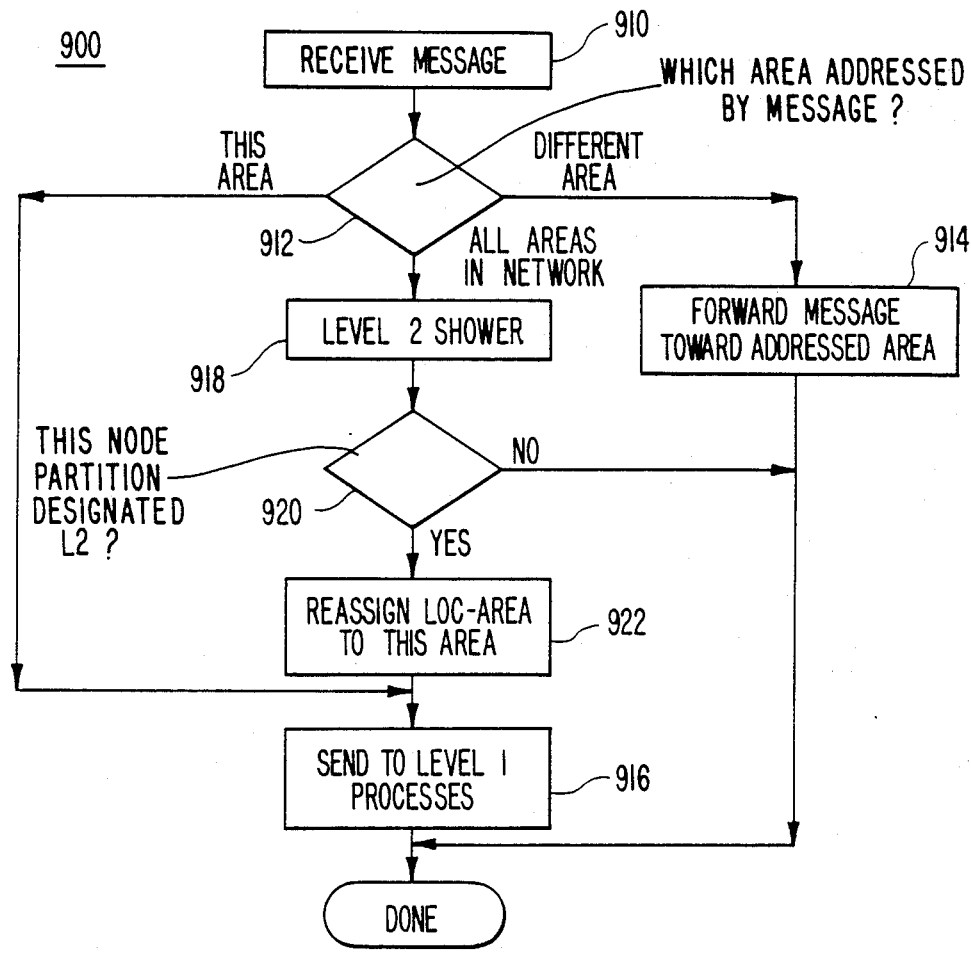

METHOD OF MULTICAST MESSAGE DISTRIBUTION

BACKGROUND OF THE INVENTION

A. Field of the Invention

The invention relates generally to distribution of messages to a set of communication nodes within a communication network and specifically to distribution of multicast messages to a range of nodes within a network.

B. Explanation of Multicast Message Distribution

An understanding of the problems associated with transmitting multicast messages requires an understanding of networks and nodes. Hence the following explanation is given of relevant terminology and network architecture. Following that explanation is a description of other attempts at multicast message distribution.

1. Terminology

A communication network consists of "communication nodes" and "links." Generally, the term "node" is used to describe a point at which one or more functional units connect to transmission lines. For purposes of this application the term "nodes" will be used to represent the portion of a functional unit in a network which is responsible for communication on that network.

Functional units can include data processing elements designed for communication over a network such as users' data terminal equipment, computer systems running programs which require use of the transmission lines, computer systems dedicated to routing messages within the network or any combination of these possible functional units.

Communication nodes pass messages between each other using different types of communication "links." Communication links are interconnections between communication nodes, point to point connections or local area networks (LANs). Each node in a network is interconnected to at least one other node and is often connected to many nodes by links to those nodes. The nodes pass messages across links connecting the nodes.

A node can communicate "directly" with another node by knowing where that other node is and by forwarding a message to it. A set of nodes in which each node knows the location of the other nodes in the set is called a "group" of nodes. Within a group of nodes each of the nodes can forward a message to another node by forwarding the message through other nodes in the same group to a destination node not directly connected to the sending node.

If the node sends a message to another node which is not in the same group, the transmitting node can communicate "indirectly" with that other node by forwarding a message to a third node or a set of nodes which may then communicate directly with nodes in more than one group. That third node or the set of nodes in turn forwards the message to the node which is the intended destination for the message.

Usually the destination address of a message specifies a single node. In multicast message distribution a "multicast message" is meant to be received by a class of nodes. The destination address of a multicast message includes a "multicast address." A multicast address identifies a class of nodes rather than a single node. Communication nodes are usually configured to process a multicast message differently from a single destination message. Most methods of multicast distribution are inefficient and inflexible.

A multicast message is distributed to all nodes in a "range" of nodes. The multicast range is the set of all the nodes which a multicast message is to be distributed to in the network. Thus multicast message distribution enables a node to deliver a message to a whole class of nodes without knowing the members, and to find one member of a class of nodes.

The intended destination nodes or a multicast message are "logically related" nodes which define a class of nodes. That is, each of the logically related nodes is assigned a common multicast address. Nodes in the network may belong to any number of logically related classes. Therefore, a node may have any number of multicast addresses including no multicast address. A node without a multicast address does not belong to a multicast class of nodes.

When a communication node receives a multicast message, the node compares the multicast addresses of the node and the message and, if any of the addresses match, the node reads the message. Each communication node receiving a multicast message determines, according to a multicast distribution method, to which other nodes the receiving node should forward the message to ensure that all nodes within the multicast range of nodes receives the multicast message.

The range of a multicast message may not contain all of the logically related nodes which are in a class of nodes. Of course, all of the nodes in a range are not necessarily logically related.

Range selection for multicast distribution depends on which set of nodes the node sending a multicast message wants to receive the multicast message. This selection is based on economics and potential location of multicast message destination nodes.

2. Network Architecture

In order to operate a group of directly communicating nodes, each node in the group must "know" the correct directions or links to use in forwarding messages to destination nodes within the group.

In general, knowledge of which link to use in forwarding a message requires the node receiving that message to know the status of its group of directly communicating nodes. The status of those directly communicating nodes includes their current configuration or topology and an identification of which of the directly communicating nodes are currently "active" and may be used to forward a message to another node. An active node is a node capable of communicating to the other nodes in the network.

Knowledge of the status of the group of directly communicating nodes generally requires that each active node in the group know its immediate "neighbors." The neighbors of a node are those active nodes which are connected to that node by a single link.

In one mechanism for inter-node communication to provide such knowledge, each node prepares a packet of information designated as a "link state packet." The link state packet contains, inter alia, the address of the node preparing the packet, the neighbors of the node preparing the packet, and information concerning each link with that node's corresponding neighbors. All of the directly communicating nodes in a group collect these link state packets from other nodes in the group and make a list of the nodes and their associated status information.

The link state packets are primarily used for calculation of pathways through the network. One example of such a calculation which is discussed in A. V. Aho, J. E. Hopcraft, J. D. Ullman, *Data Structures and Algorithms*, Addison-Wesley, Reading, Mass., 1983, Dijkstra's algorithm, and which is herein incorporated by reference, is the creation of a least cost "spanning tree." The least cost spanning tree is an ordered interconnection of all directly communicating nodes which has no loops and provides the least "cost" path from the node calculating the spanning tree to every other node in a group of directly communicating nodes.

The cost of each path is determined according to criteria chosen by whomever operates the network. These criteria include such factors as the actual price of using the link which could be a leased line, or the volume of traffic through a particular link or node. For example, in order to encourage uniform utilization of the network links, the cost of high volume links would be increased.

Using link state packets, each node determines which nodes and links are active in its corresponding group of directly communicating nodes and then uses that information to determine a spanning tree. The spanning tree of each node dictates which link to use in forwarding messages to directly communicating nodes in the corresponding node group.

The directly communicating communication nodes in each group should each periodically update the status of the other directly communicating nodes by regularly creating and transmitting new link state packets and using the packets received from other directly communicating nodes to update their own spanning tree. This update process ensures, among other things, that if a node becomes inactive, a new operable path connecting every node in the group will be formed, if possible. Updating creates a problem, however. As the number of nodes in a group increases, a greater amount of time is spent calculating the necessary path information. At some point it becomes inefficient to add any more nodes to the group of directly communicating nodes.

Furthermore, greater numbers of nodes in a group require greater amounts of network resources such as processor time required for network operations and computer memory space to hold network status information.

In order to accommodate an increasing number of nodes, a hierarchical structure can be introduced into the network. For example, the network can be divided into several areas, each area can correspond to a different group of directly communicating nodes. Certain nodes will only be able to communicate directly with the other nodes in the same area and these are referred to as "level one nodes", and can be considered to constitute the first hierarchical level.

Other nodes are capable of direct communication with level one nodes in one area as well as similar nodes in other areas. These nodes are referred to as "level two nodes" and constitute a second hierarchical level. All level two nodes communicate with each other and operate in a similar manner to level one nodes communicating in the same area.

Using this scheme, level one nodes within one area may send a message to level one nodes in another area by forwarding the message to a level two node which in turn forwards the message via level two nodes to another level two node within the appropriate area. Once the message arrives in the correct area it is forwarded by level one nodes to the destination node.

3. Prior Attempts at Multicast Distribution

The multicast message must be distributed throughout a range of communication nodes which should include the corresponding nodes for which the multicast message is intended. Thus, every node in the range of nodes which receives the multicast message may be an "interested" node.

One conventional method of multicast distribution is called "reverse path forwarding." In reverse path forwarding, a node first examines a multicast message to determine whether the multicast message is received over a link which the node would normally use in forwarding messages to the node which is the source of the multicast message. If so, the node forwards that message along all of the links connected to the node except the link on which the message was received. In other words, nodes forward multicast messages received on links which correspond to the pathway in its spanning tree which includes the source of the message.

However, this method of multicast distribution is not suited for busy networks because it overloads the network with unnecessary message processing. Unnecessary message processing occurs when a message is received by a node across links not in the spanning tree. Reverse path forwarding causes unnecessary message processing because a multicast message is only accepted for forwarding when the message is from the link in the receiving node's spanning tree corresponding to the message source. This is disadvantageous because a node can receive many copies of the same message which do not require any processing but occupy resources while the node determines if a multicast message should be forwarded. High volume nodes which carry many messages during normal operation should not be burdened by unnecessary message transmissions.

This type of reverse path forwarding is also not suited to hierarchical networks since each node decides whether to forward the message based on the source of the message. In a hierarchical network, this source dependence is not feasible because, inter alia, the hierarchical levels usually are independent of each other and would not necessarily have a spanning tree containing the node.

Modifications to the reverse path forwarding approach of multicast distribution reduce unnecessary message processing but add the expense of computational time and memory space or reduce the system effectiveness. For example, an extension of the basic reverse path forwarding technique involves specifying a distance as a number of links between communication nodes which the message traverses before forwarding is discontinued. However, by limiting the number of links between communication nodes, this method produces an inflexible system which can not adapt to changes in the network topology.

All of these methods of multicast message distribution use network resources inefficiently, are unable to operate in a hierarchical network architecture, and are inflexible.

SUMMARY OF THE INVENTION

To avoid these problems and in accordance with the purpose of the invention, as embodied and broadly described here, in a communication network having a plurality of interconnected communication nodes, each of which is directly communicating with at least one other of said nodes by virtue of a corresponding list of known nodes maintained within each node, a method of distributing a multicast message addressed to a range of nodes in said network comprises the steps of determining, by each of said nodes from its corresponding list of known nodes, at least one group of directly communicating nodes containing the node; calculating, by each of said directly communicating nodes in each of said groups, a corresponding unique set of pathways between the nodes in the corresponding group for distributing multicast messages to said directly communicating nodes in said group including the substeps of selecting one of the nodes in each group of directly communicating nodes to be a root node for that group, and calculating said unique pathways for each group to connect the root node for that group to every other directly communicating node in that group without causing said pathways to form loops; and showering said multicast message to all of said nodes in the corresponding range by distributing said multicast message along said unique set of pathways corresponding to the groups containing the nodes in said range.

The accompanying drawings, which are incorporated and are constituted as part of the specification, illustrate one embodiment of the invention and, together with the description, serve to explain the principles of the invention.

BRIEF DESCRIPTION OF THE DRAWINGS

FIG. 7 is a flow diagram illustrating a preferred procedure for message reception procedure by level 1 processes air accordance with the present invention.

FIG. 8 is a flow diagram illustrating a preferred procedure for handling received messages in accordance with the method of the present invention; and FIG. 9 is a flow diagram illustrating a preferred procedure for message reception procedures executed by level 2 processes in accordance with the present invention.

DESCRIPTION OF THE INVENTION

Reference will now be made in detail to the present preferred embodiment of the invention, an example of which is illustrated in the accompanying drawings.

A. Network and Node Organization

Figure 1:
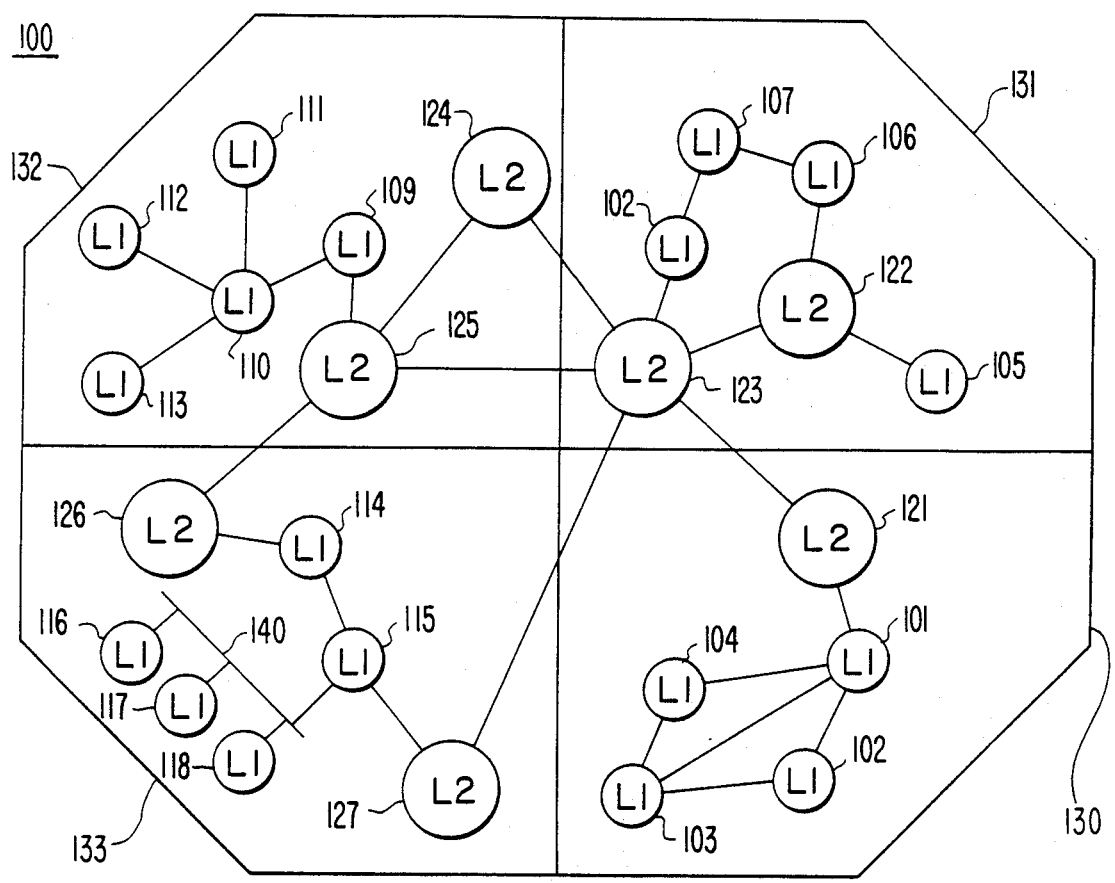
FIG. 1 shows a network configuration having nodes and links interconnecting the nodes and end nodes.

FIG. 1 shows a typical network configuration which can operate in accordance with the present invention. In accordance with the invention, network 100 has a plurality of communication nodes, each of which is directly communicating with at least one other of said nodes by virtue of a corresponding list of known nodes maintained within each node. Preferably, network 100 consists of communication nodes 101-118, 121-127 which are either "intermediate system" nodes 101-104, 106-110, 114-115 or "end system" nodes 105, 111, 112, 113, 116, 117, and 118. An end system node is referred to as an "end node" and an intermediate system node is referred to as a "node." An end node does not forward messages, but only generates messages and receives messages.

According to the hierarchical structure of the present invention, the network 100 is divided into areas of nodes wherein in each of the areas ones of the nodes designated as level one nodes may only communicate directly with other ones of the nodes in the same area. The areas are sometimes referred to as subdomains when the network is called a domain. Network 100 in FIG. 1 is divided into four areas: 130, 131, 132, and 133.

Each of the level 1 nodes (L1) 101-118 are in one of areas 130-133 of network 100, and each level 1 node maintains a list of all other known level one nodes which are located in the respective corresponding area 130-133.

A second hierarchical level comprises second level nodes designated level 2 nodes. Level 2 nodes are distributed throughout the areas of the network and each level 2 node maintains a list of all other level 2 nodes in the network. The level two nodes constitute another group of directly communicating communication nodes. Level 2 nodes may also belong to one of the group of level 1 nodes also.

Each of the nodes in network 100 is a communication node which transmits messages across links to other communication nodes. In FIG. 1 all the links are point to point links, except link 140 which is a connecting level 1 node 115, and end nodes 116, 117, and 118.

The exchange of messages which take place in the preferred embodiment of the present invention relate to the "network layer." Network operations have several levels of protocol which are set by the International Standard Organization (ISO). The levels perform different functions such as standardizing and defining the formats used to communicate in a network. The network layer is the protocol level which governs the routing of messages through the network. Subnetwork layers control the physical transmission of the messages and other aspects of communication in a network. In the hierarchy of protocol levels the subnetwork layers are below the network layer.

According to the ISO standard, there are three different types of messages sent across the links in the network layer. Messages which carry information or data which is not related to network operation are called "data packets." Messages transferred between neighboring nodes on a regular basis which indicate that the sending node is active are called "hello" messages. Messages transmitted by every node to indicate the current status of that transmitting node and the nodes connected to the transmitting node by a link are called "link state packets." The link state packets will be described in greater detail below.

Prior to describing a method of multicast distribution in accordance with this invention, it is important to convey an understanding of the node configuration because the nodes perform the steps of the multicast method in the preferred embodiment. Although there are two different types of nodes, i.e., intermediate nodes and end nodes, for purposes of understanding the invention it is only necessary to understand the general node architecture associated with the node routing functions.

Figure 2:
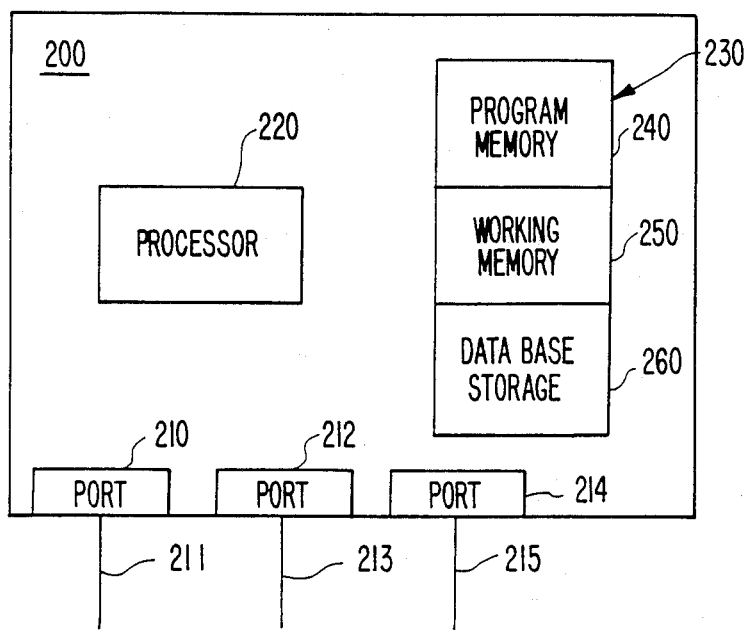
FIG. 2 is a block diagram of the elements in each of the nodes in FIG. 1 which are used to carry out a preferred embodiment of the present invention.

A preferred embodiment of a node containing the necessary elements to carry out the method of this invention is shown in FIG. 2. Node 200, which has a unique address in network 100, has three different ports 210, 212, and 214 connected to links, 211, 213, and 215, respectively.

Node 200 also includes a node processing unit 220, which is preferably a commercially available microprocessor but can also be a specially designed unit. Processing unit 220 may consist of one or more processors which operate solely node functions or which also execute other tasks. The only necessary feature of node processing unit 220 for purposes of the present invention is that it contains sufficient circuitry and capability to perform the processes described below.

Node 200 also preferably includes a node memory unit 230 which has three portions: (1) program memory 240; (2) working memory 250; and (3) data base storage 260. Program memory 240 contains various sequences of instructions which cause the node processing unit 220 to perform necessary and desired operations. Program memory 240 can either be a ROM, PROM, or a RAM, depending upon the design considerations and expected use of program memory 240.

Node memory unit 230 also includes a working memory 250 which is preferably a RAM. The purpose of working memory 250 is to provide temporary storage, such as when executing the spanning tree algorithm or to store messages which are being forwarded through the node and received by the node.

The final portion of node memory unit 230 shown in FIG. 2 is node data base storage 260. Preferably, data base storage 260 includes a RAM containing tables or data bases, such as a routing forwarding data base. The routing forwarding data base contains a table correlating different destination node addresses to corresponding links to be used to transmit messages to those nodes. This table contains the results of the spanning tree algorithm.

An example of commercially available hardware utilized to implement node 200 the method of the present invention is the DECnet Router manufactured by Digital Equipment Corporation.

In order for the nodes to communicate with other nodes in their respective groups of directly communicating nodes, each node must be aware of the topology of its group, including the currently active nodes in the group and the current interconnection of links across which messages should be forwarded to reach a destination node. In order to determine the group of directly communicating nodes, each node must first maintain a list of active nodes which are its neighbors. The active nodes are those nodes able to communicate with other nodes in the network.

In order to determine which neighboring nodes are currently active, each node continually transmits "hello" messages along the links with which it is connected and receives "hello" messages from active nodes connected to these links. The process of determining the neighbors of a node is managed by processes in subnetwork layers which pass the information up to the network layer.

B. Node Operation

Figure 3:
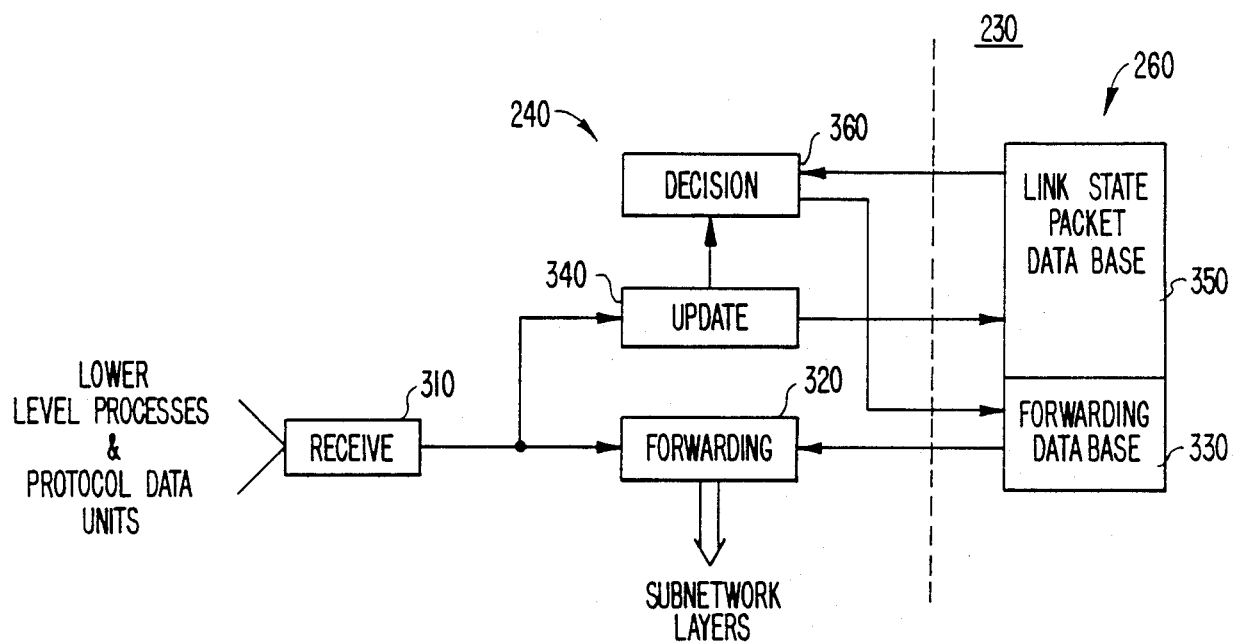
FIG. 3 is a block diagram of a preferred routing process carried out by nodes in accordance with this invention.

FIG. 3 illustrates the relationship among routing processes in the network layer performed by intermediate system nodes in accordance with a preferred embodiment of this invention. The processes consist of a receive process 310, a forwarding process 320, an update process 340, and a decision process 360. Preferably, all of the processes are stored in program memory 240 and are carried out by processor 220 in FIG. 2. Because end nodes only generate and receive messages and do not forward messages, they do not require the routing processes illustrated in FIG. 3. A receive process 310 receives messages generated in the subnetwork layers within its own node and network layer messages sent across the links coupled to the corresponding node.

Forwarding process 320 accepts data messages and link state packets for forwarding to the appropriate nodes across corresponding links. Link state packets are forwarded to all nodes in the network and data messages are generally forwarded to an intended destination address. Forwarding process 320 forwards nonmulticast data messages by first determining whether the message is intended for its corresponding node and, if not, which link is appropriate for transmitting the message to its destination address. Forwarding process 320 accomplishes these tasks by comparing the message's destination address to destination addresses stored in a forwarding data base 330 in data base storage 260.

Update process 340 is responsible for maintaining link state packet data base 350 in storage 260, and for forwarding notification of a change in the neighbors ("neighbor event") or any of the link state packets in link state packet data base 350 to decision process 360. Link state packet data base 350 stores lists of nodes known to node 200, those nodes being the directly communicating nodes which form the group or groups containing node 200.

Update process 340 receives link state packets and neighbor events from receive process 310. A neighbor event is a notification from a subnetwork layer process that a neighbor has been added or deleted.

Update process 340 also generates the link state packet for its node. The link state packet contains a list of active neighbors of the node generating the packet. That list is referred to as the local link status. In generating local link status, update process 340 adds neighbors to and deletes neighbors from the node's link state packet in response to a neighbor event. If a "hello" message is received from a previously inactive link, a neighbor event notifies update process 340 to add the node which generated the "hello" message to the list of neighbors in the link state packet. If no "hello" message is received from a previously active node for a given period of time, a neighbor event notifies update process 340 to delete the neighbor from the node's link state packet. When the local link state changes or when update process 340 detects a variation in the link state packet data base update process 340 notifies decision process 360.

Decision process 360 is responsible for calculating a spanning tree using Dijkstra's algorithm to determine the routing forwarding data base stored in forwarding data base 330. A spanning tree is an ordered interconnection of all nodes in the network. That is, all of the nodes out from a root node are arranged in order so that there are no loops within the set of pathways through the nodes.

The calculation of the spanning tree requires that one node in each group be selected as a root node from which the set of pathways can be determined. To maintain the routing forwarding data base for single destination messages, decision process 360 first calculates the spanning tree using its own node as the root.

Figure 4:
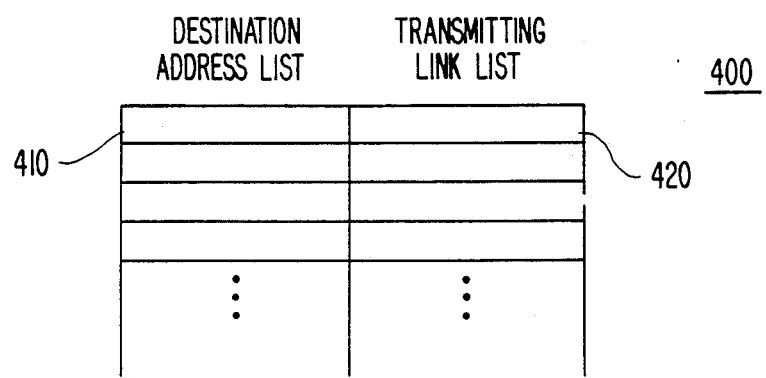
FIG. 4 is an illustration of a routing forwarding data base.

In order to compile a routing forwarding data base, decision process 360 preferably utilizes the spanning tree to form a table such as data base 400 shown in FIG. 4, which preferably represents a portion of forwarding data base 330. Data packet forwarding data base 400 has two lists, destination address 410 and transmitting link 420. Destination address list 410 contains addresses of known nodes and is correlated with transmitting link list 420 which identifies links to correspond with the known nodes. Forwarding process 320 uses data base 400 when it receives a message from receive process 310 to determine which link from transmitting link list 420 forwarding process 320 should use to forward the message via the least cost pathway. The details of receive process 320, forwarding process 310, update process 340, and decision process 360 will also be discussed with respect to the multicast distribution method of the present invention.

C. Node Hierarchy

As the number of directly communicating communication nodes in a group increases, the time that it takes decision process 360 to implement Dijkstra's algorithm increases at a rate faster than the increase in the number of links. Moreover, the memory area necessary to store the link state packet data base also increases when more links and nodes are present. Consequently, a hierarchical structure has been introduced to the network of the preferred embodiment of the present invention.

Each of the nodes in the network, except for the end nodes, has the ability to forward messages to any other node, including end nodes, within its area. Most level 2 nodes 121–127 are also able to forward messages not only within their area but also to other level 2 nodes outside of their respective areas since level 2 nodes can belong to two groups of directly communicating nodes. Some level 2 nodes are not linked to any level 1 nodes and therefore only communicate with other level 2 nodes.

In order to have the dual capability, the level 2 nodes linked to level 1 nodes have two sets of receive process 310, forwarding process 320, update process 340, and decision process 360 corresponding to level 1 and 2 processes. Thus, some level 2 nodes must also maintain two lists of known active nodes for the respective groups.

The two sets of processes in the level 2 nodes are nearly identical. The level 1 processes occurring in a level 2 node are slightly different because in level 2, node messages which are forwarded to nodes which are not in the local area must be passed from the level 1 processes to the level 2 node processes. The level 2 processes then pass messages to the level 1 processes when messages intended for a node in the local area are received from outside of the local area.

Level 2 nodes forward messages to the appropriate areas. Because level 2 nodes constitute a group of directly communicating nodes within network 100, each level 2 node must be aware of the status of the active level 2 nodes within network 100. To obtain such awareness, level 2 nodes have a link state packet data base of level 2 link state packets, and a forwarding data base which correlates destination addresses of level 2 nodes with links across which messages should be transmitted to those level 2 nodes. The spanning tree algorithm is computed by each level 2 decision process so that a level two routing forwarding data base may be calculated.

D. Message Formats

Figure 5:
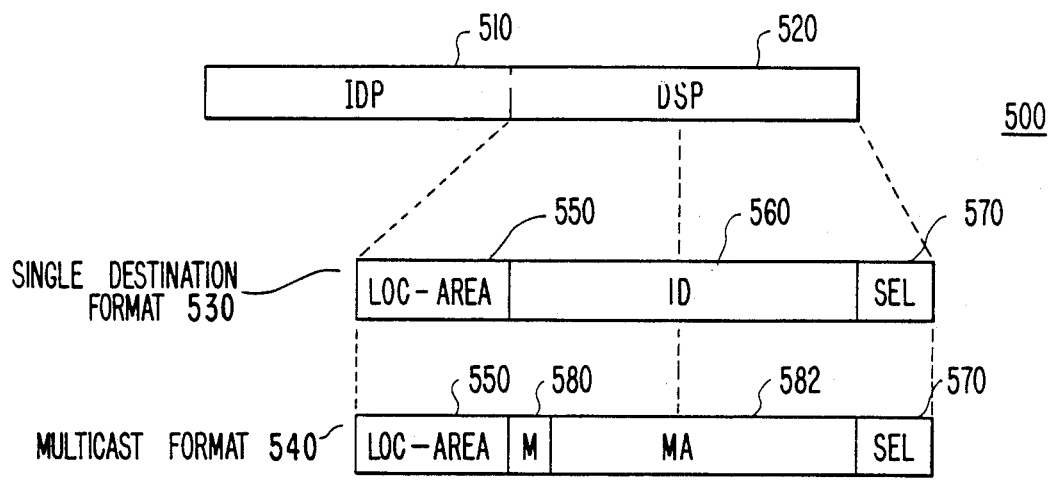
FIG. 5 is an illustration of a preferred network address format.

Network addresses for messages contain a number of portions which are illustrated in FIG. 5. The ISO format for a network address 500 contains an initial domain part (IDP) 510 and a domain specific part (DSP) 520. Initial domain part 510 designates a network identifier. For example, network 100 illustrated in FIG. 1 will have a specific address among a number of other possible networks as specified by the initial domain part 510.

Domain specific part (DSP) 520 is defined in a general single destination format 530 and a multicast address format 540. For the single destination format 530, DSP 520 includes a local area (LOC-AREA) identifier 550, an identifier (ID) field 560, and a select field 570. For the multicast address format 540, DSP 520 includes LOC-AREA 550, multicast bit 580, multicast address 582, and select bit 570.

In both the single destination and multicast address formats 530 and 540, respectively, each area of the network is uniquely defined by the combination of IDP 510 and LOC-AREA 550. LOC-AREA 550 uniquely defines the areas within individual networks.

Select field 570 uniquely identifies each of several modules which may be associated with an addressed node. A module can be any compatible subsystem such as a specific aspect of a system utilizing a node or a set of data terminal equipment to which a message may directed.

In single destination format 530, ID field 560 indicates the address of the node to which the message is sent. In the multicast destination format, ID field 560 includes, as the first bit, a multicast bit 580. Multicast bit 580 indicates that the data message should be distributed according to multicast distribution. ID field 560 also includes multicast address field 582. In multicast distribution, address field 582 contains the multicast address which a node uses to test whether the multicast address is of interest to the node. ID field 560, which is preferably defined according to IEEE 802 standard, multicast address 582, corresponds to the "group address".

When a node sends a multicast message, the sending node selects a corresponding multicast range which should include nodes having a corresponding multicast address. According to the present invention the multicast range may be a link (i.e., identifying all nodes connected to that link), an area (i.e., all nodes in that area), or the entire network. If the range is equal to a single link, only nodes connected to the single link will receive the multicast message and none of the nodes receiving the message will forward it along another link. A single link can be the multicast range for a LAN having a plurality of intended nodes.

Accordingly, the multicast range is specified in the address portion of respective multicast messages. In the preferred embodiment of the invention, two values for local area field 550 have been reserved for multicast range identification. For example, if local area field 550 equals zero then the multicast range is equal to a single link. If local area 550 equals all ones, then the multicast range is the entire network. All other multicast messages will be distributed to the area specified in the local area field 550.

E. Multicast Message Forwarding

According to the invention, each of the nodes in the network determines, from its corresponding list of known nodes, at least one group of directly communicating nodes containing the node. In the preferred embodiment, level 1 processes use a level 1 list of known active nodes in link state packet data base 350 and level 2 processes utilize a level 2 list of known nodes also stored in link state packet data base. Each of the nodes in a group is able to communicate directly with the other nodes in the group by virtue of knowing which active nodes are in a direct communication group with the corresponding node.

Then, according to the present invention, each of the group of nodes calculates a corresponding unique set of pathways between the nodes in the corresponding group for distributing multicast messages to the directly communicating nodes in the group. In the preferred embodiment of the present invention, the corresponding unique set of pathways is a multicast spanning tree constructed for the appropriate group of directly communicating nodes. In calculating the multicast spanning tree, each node in a group uses a common root node and therefore calculates a single spanning tree for each corresponding respective group.

Figure 6:
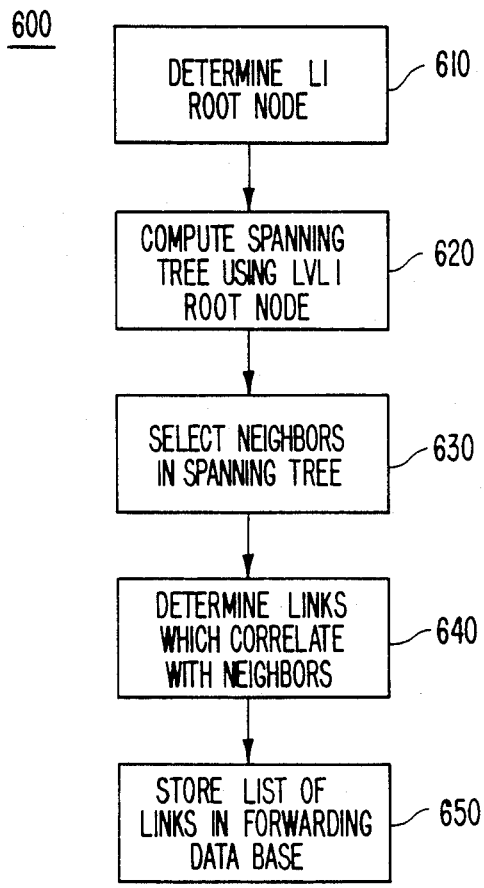
FIG. 6 is a flow diagram of a procedure followed by level 1 nodes in calculating the multicast spanning tree.

FIG. 6 illustrates a preferred procedure 600 followed by level 1 nodes in calculating the multicast spanning tree. Preferably processor 220 would execute procedure 600 stored as a program in program memory 240. Multicast spanning tree procedure 600 begins with all the level 1 nodes in an area selecting a root node for the spanning tree calculation (step 610). The root node is preferably selected using some simple criterion such as the lowest or highest address value.

Using the root node for an area, each level 1 node then calculates the multicast spanning tree for that area (step 620). The nodes preferably compute the multicast spanning tree in the same manner that they calculate the routing spanning tree for the routing forwarding data base (i.e., Dijkstra's algorithm) with one exception. For the multicast spanning tree, instead of each node using itself as the root node, the common root node is used.

Using decision process 360, level 1 nodes select their neighbors in the multicast spanning tree (step 630). The multicast neighbors of a node are those active nodes which are connected to that node by a single link along the multicast spanning tree.

In using the neighbors selected for the multicast spanning tree, the level 1 nodes then correlate the links to those neighbors in the multicast spanning tree using decision process 360 (step 640). The list of the correlated links is stored in the forwarding data base (step 650) and used to forward multicast messages as will be described below.

The level 2 nodes in a group of directly communicating nodes also calculate a multicast spanning tree for all level 2 nodes. As was discussed previously, each level 2 node contains a set of level 2 processes virtually identical to level 1 processes. The level 2 processes calculate a level 2 multicast spanning tree using the same steps as the level 1 nodes calculate a level 1 spanning tree, except that a level 2 root node is selected rather than a level 1 root node.

As with the routing forwarding data base, the multicast spanning tree and associated table is intermittently updated throughout operation of the network in response to changes in the network topology. An updated table of appropriate links within the multicast spanning tree is needed for the remainder of the method according to the present invention.

According to the invention, multicast messages are showered to all of the nodes in the corresponding multicast range by distributing the multicast messages along the unique set of pathways, e.g., the multicast spanning tree corresponding to the groups containing the nodes in the range. Preferably, the showering of multicast messages to all nodes in the corresponding multicast range follows the procedures outlined in the flow diagram of FIG. 8.

FIG. 7 illustrates a procedure 700 of the method of the present invention which is followed when a message is received by a level 1 node. After receiving a message (step 710), the level 1 node in a hierarchical network must determine whether the message is for its own area (step 712). If the message is not for the corresponding area of the receiving node, the message is then sent to the nearest level 2 node (step 714), which is identified by its position in the spanning tree. For example, the nearest level 2 node may be the current node in which the level 1 processes are executing the procedure of level 1 message reception. After the message is sent to the nearest level 2 node (step 714), the level 1 reception procedure is complete (step 799).

If the message is for the node's area, that message is then sent to higher layer processes within the node (step 716). These higher layer processes in each node determine whether the message is intended for that node. The network layer is not concerned with whether the users or other equipment in the node is interested in the message, the network layer only controls routing of messages through the network. The modules which share the node determine if their normal destination address or multicast addresses are equal to the single destination address or multicast address of the multicast message received at the higher protocol layers. If the multicast message received is of interest to the modules of the node, then it is read by those modules.

If the receive process determines that the message is not a multicast message (step 718), then the node forwards the message to the addressed destination through the group of nodes in an area using the link identified in forwarding data base 330. After such forwarding, procedure 700 is complete (step 799).

If the message is multicast (step 718), and if the multicast range is equal to a single link (step 722), then no other nodes besides those connected to the link on which the multicast message was forwarded should receive the message. In that case, the receiving node is not required to forward the message, and is finished with the message reception process (step 799).

If the multicast range is larger than a single link (step 722), the node checks whether the multicast message was received from an end node, its own node or a link in the spanning tree (step 724). If the source of the message is not one of the sources for which the multicast distribution method is intended to forward, then message reception process 700 is complete (step 799). The message source could be the node itself if, for example, the node is executing the level 1 message reception within the level 1 processes. This could occur when the message was generated by internal modules, such as data terminal equipment for node users.

The node receiving the multicast message then sends the multicast message to all end node neighbors (step 726) and implements a level 1 shower (step 728). Preferably, this includes sending the message across every link connected to the corresponding node which is in the multicast spanning tree, except for a link within the spanning tree on which a message has arrived.

Procedure 700 also corresponds to a procedure which may be used in a non-hierarchical group of directly communicating nodes, i.e, a network having no level 2 nodes. When the method of the present invention is utilized in a non-hierarchical network, the procedure is changed by deleting steps 712 and 714 which correspond to level 2.

FIG. 8 illustrates a procedure for implementing a shower according to a preferred embodiment of the present invention. Shower procedure 800 is implemented by both level 1 and level 2 processes. First a forwarding process such as, level 1 forwarding process 320, retrieves the level 1 multicast neighbor list stored in a forwarding data base, such as data base 330 (step 810).

The forwarding process then determines, from the receive process such as receive process 310, on which link the multicast message was originally received (step 820). The multicast message is then forwarded along all the links in a multicast neighbor list, such as the level 1 multicast neighbor list, except the link on which the message was received (step 830). The level 1 multicast neighbor list is the list of all the links correlated to the neighbors in the level 1 multicast spanning tree. Since all the nodes in a group are interconnected by a multicast spanning tree, all the nodes in the area will receive the multicast message without any redundant transmissions.

As explained above, in the preferred embodiment of the present invention, a second hierarchical level exists in which the level 2 nodes constitute a group of directly communicating nodes which may communicate with each across area boundaries. The second hierarchical level, or level 2, facilitates having a network multicast range option for distributing multicast messages to all nodes within the entire network.

Level 2 message reception procedures are illustrated by flow chart 900 in FIG. 9. These message reception procedures are implemented by level 2 processes. Accordingly, the step of calculating a unique set of pathways, i.e., the multicast spanning tree, includes calculating a level 1 spanning tree for each corresponding area and calculating a level 2 spanning tree for all level 2 nodes in the network by each level 2 node in the network. The calculation of a level 2 spanning tree in the preferred embodiment includes choosing a root node common to all level 2 nodes, and using the root node for the spanning tree calculation. Similar to the level 1 calculation of interconnections, the level 2 processes preferably use Dijkstra's algorithm as applied to the root node and create a list of the links connected to the corresponding node which are in the spanning tree.

After a message is received (step 910), the level 2 node executing level 2 processes determines the multicast range of the message (step 912). If the message is addressed to a different area, then the message is forwarded conventionally towards the addressed area using the routing spanning tree and corresponding data base (step 914 . If the message is addressed to the area corresponding to the location of the receiving level 2 node, then the level 2 node simply sends the message to the level 1 processes within the level 2 node (step 916). The level 1 processes then implement message reception procedures, such as they are illustrated in FIG. 7.

If a message is addressed to all areas in the network, i.e., the message has a network range, then a level 2 shower is implemented in much the same manner as the level 1 shower is implemented (step 918). The one difference is the use of a level 2 multicast neighbor list which is the list of all the links correlated to the level 2 neighbors in the level 2 multicast spanning tree.

In order to distribute multicast messages to each node within the areas of the network, selected level 2 nodes are designated as partition designated level 2 nodes which serve as, inter alia, entry points into the level 1 multicast spanning tree. In the preferred embodiment of the present invention there is a single partition designated level 2 node selected for each group of directly communicating nodes in an area. The partition designated level 2 node for an area is selected from all level 2 nodes in that area based on the address of such nodes. For example, the level 2 node having the largest or smallest address may chosen as the partition designated level 2 node.

Each link state packet, then identifies the sender of the packet as either a level 1 or level 2 node, and indicates which level 2 node has been selected by that node as a partition designated level 2 node. Decision process 360 for the level 2 decision process selects the partition designated level 2 node from the link state packets generated by level 2 nodes.

If a level 2 node receiving a message is a partition designated level 2 node (step 920), then the area addressed by the multicast message is assigned to be the corresponding area of the partition designated level 2 node (step 922). The assigned multicast message is passed down into the level 1 processes illustrated in FIG. 7 eventually causing a level 1 shower to be implemented.

With the minimal computation and memory to generate the multicast spanning trees and select the partition designated level 2 node, the method of the present invention uses a relatively small amount of the network resources. In addition, the inefficiencies of redundant message transmissions are avoided by using only those links in one spanning tree, the multicast spanning tree, to distribute the multicast messages along each hierarchical level.

Using the partition designated level 2 node in conjunction with the addressing techniques shown for the preferred method of multicast message distribution makes the method almost transparent to the nodes in the network. The simplicity and transparency of the method according to the present invention make it ideal for use in a hierarchical network architecture.

It will be apparent to those skilled in the art that various modifications and variations can be made in the multicast method of the present invention without departing from the scope or spirit of the invention. It is intended that the present invention cover the modifications and variations of this invention, provided they come within the scope of the appended claims and their equivalents.

What is claimed is:

1. In a communication network having a plurality of interconnected communication nodes, each of which is directly communicating with at least one other of said nodes by virtue of a corresponding list of known nodes maintained within each node wherein those of said nodes which are communicating nodes are capable of transmitting and receiving messages, a method of distributing a multicast message addresses to a corresponding range of nodes in said network, the range of nodes corresponding to said multicast message including the ones of said nodes to which said multicast message is directed, said method comprising the steps of:

determining, by each of said nodes from its corresponding list of known nodes, at least one group of directly communicating nodes containing the node;

calculating, by each of said directly communicating nodes in said group, a corresponding unique set of pathways between the nodes in each corresponding group for distributing multicast messages to said directly communicating nodes in said group; and distributing said multicast message to all of said nodes in the corresponding range through said unique set of pathways corresponding to the groups containing the nodes in said range.

2. A method according to claim 1 wherein the step of distributing said multicast messages to all of said nodes in the corresponding range includes the substeps of:

determining, by each of said nodes receiving said multicast messages, whether that node is within the range for said multicast message;

determining, by each of said receiving nodes in the range for said message, whether the message is intended for that receiving node; and forwarding, by each of said receiving nodes in the multicast range, said multicast messages along said unique set of pathways to any other of said nodes in the corresponding group and in said range.

3. A method according to claim 2 wherein said multicast message includes a local area field and an identifier field and wherein the method of distributing a multicast message further includes the step of analyzing the identifier field of received messages to determine if these messages are multicast messages.

4. A method according to claim 3 wherein said identification field contains a multicast bit identifying said message as a multicast message; and wherein said step of analyzing includes the substep of checking said multicast bit.

5. A method according to claim 3 wherein said step of determining whether that node is within the range of said multicast message includes the substep of analyzing the local area field of said multicast message to determine if the node is in the range of said multicast message.

6. A method according to claim 5
    wherein said network is divided into areas of said nodes;

wherein in each of said areas ones of said nodes designated as level one nodes may only communicate directly with other ones of said nodes in the same area;

wherein selected ones of said nodes designated as level two nodes may communicate directly with other ones of said level two nodes throughout the network and may communicate directly with level one nodes within corresponding areas;

wherein said unique set of pathways corresponding to the nodes in the group of directly communicating nodes defined by each of said areas is designated a level one multicast spanning tree;

wherein said unique set of pathways corresponding to the group of directly communicating nodes designated level two nodes is designated as the level two multicast spanning tree;

wherein said method further includes the substeps of:

forwarding, by each of said level one nodes, said multicast message to one of said level two nodes in said corresponding group for that level one node if said message is not addressed to any of the nodes in the corresponding group for that level one node;

determining, by each of said level two nodes receiving said multicast message forwarded by respective level one nodes, whether the multicast message is a network multicast message having a range including all of said nodes in said network; and wherein said step of distributing said multicast message to all of said nodes in the corresponding range includes the substep of forwarding, by each of said level two nodes in said corresponding group, the network multicast messages along said level two multicast spanning tree.

7. A method of multicast message distribution according to claim 1 further including the steps of:

designating, by each level two node, one of said level two nodes in each of said groups, except groups only including level two nodes, as a partition designated level two node;

assigning, by each of said partition designated level two nodes, a multicast range for the network multicast message for the group for which the Partition designated level two node was designated and distributing said assigned multicast message to the corresponding multicast range through the unique sets of pathways corresponding to the groups containing the nodes in said corresponding multicast range.

8. A multicast communication node operable for directly communicating with at least one group of interconnected communication nodes in a network wherein the nodes are connected by links and wherein multicast messages are transmitted to selected nodes in said network, said node comprising:

a node memory including a program memory for storing sequences of instructions including a decision, an update process, and a forwarding process, a working memory for temporarily storing data and for storing messages to be forwarded, and a data base storage including a link state packet data base storage for storing a list of all known nodes within a group of nodes with which the node may directly communicate, and a forwarding data base for storing lists of links over which messages will be forwarded according to the type of message; and processor means, connected to the node memory, and capable of accessing said working memory, said program memory and said data base storage, for periodically calculating a unique set of pathways between the nodes in the list of know nodes stored in said link state packet data base in response to said update and decision processes, and for forwarding selected ones of said multicast messages along said unique set of pathways to all of said nodes in the list by distributing said multicast message in response to said forwarding process, said selected multicast messages having ranges including the nodes in said list 9. A communication node according to claim 8 wherein said program memory includes a receive process, wherein said multicast messages are distributed to said selected nodes corresponding to respective multicast ranges, wherein said multicast messages include a local area field and an identifier field, and wherein said processor means includes means responsive to said receive process for analyzing the identifier field of messages received by the node to determine if said received messages are multicast messages and for analyzing the local area field of said received multicast messages to determine if the node is in the range of said multicast message.

10. A communication node according to claim 8 wherein said processor means includes means responsive to said decision process for selecting one of the nodes in each group of directly communicating to be a root node for that group and for calculating said unique pathways for each group to connect the root node for that group to every other directly communicating node in that group without causing said pathways to form loops.

11. In a communication network having a plurality of interconnected communication nodes, each of which is directly communicating with at least one other of said nodes by virtue of a corresponding list of know nodes maintained within each node, wherein those of said nodes which are communicating nodes are capable of transmitting and receiving messages, a method of distributing a multicast message addressed to a corresponding range of nodes in said network, the range of nodes corresponding to said multicast message including the ones of said nodes to which said multicast message is directed, said method comprising the steps of:

determining, by each of said nodes from its corresponding list of known nodes, at least one group of directly communicating nodes containing the node;

calculating, by each of said directly communicating nodes in said group, a corresponding unique set of pathways between the nodes in its corresponding group for distributing multicast messages to said directly communicating nodes in said group, said calculating step including the substeps of:

selecting one of the nodes in each group of directly communicating nodes to be a root node for that group, and calculating said unique pathways for each group to connect the root node for that group to every other directly communicating node in that group without causing said pathways to form loops; and distributing said multicast message to all of said nodes in the corresponding range through said unique set of pathways corresponding to the groups containing the nodes in said range.

* * * * *

UNITED STATES PATENT AND TRADEMARK OFFICE
CERTIFICATE OF CORRECTION

PATENT NO. : 4,864,559

DATED : September 5, 1989

INVENTOR(S) : RADIA PERLMAN

It is certified that error appears in the above-identified patent and that said Letters Patent is hereby corrected as shown below:

Claim 4, col. 15, line 37, delete "fication" and insert
--fier--.

Claim 7, col. 16, line 20, delete "1" and insert --6--.

Claim 7, col. 16, line 29, delete "assigned".

Claim 7, col. 16, line 30, after "corresponding" insert
--assigned--.

Claim 10, col. 17, line 14, after "communicating" insert
--nodes--.

Signed and Sealed this

Twenty-fourth Day of September, 1991

*Attest:*

HARRY F. MANBECK, JR.

*Attesting Officer*  *Commissioner of Patents and Trademarks*

UNITED STATES PATENT OFFICE
CERTIFICATE OF CORRECTION

PATENT NO. : 4,864,559
DATED : September 05, 1989
INVENTOR(S) : Radia Perlman

It is certified that error appears in the above-identified patent and that said Letters Patent is hereby corrected as shown below:

Claim 8, col. 16, line 57: change "know" to --known--.

Claim 8, col. 16, line 65: change "list" to --list.--.

Claim 11, col. 17, line 23: change "know" to --known--.

Signed and Sealed this

Twelfth Day of November, 1991

Attest:

HARRY F. MANBECK, JR.

*Attesting Officer*  *Commissioner of Patents and Trademarks*